United States Patent [19]

Gitzendanner

[11] Patent Number: 4,701,818

[45] Date of Patent: Oct. 20, 1987

[54] MEANS FOR INDEXING A ROTARY ARM IN SMALL ANGULAR STEPS

[75] Inventor: Louis G. Gitzendanner, Oklahoma City, Okla.

[73] Assignee: Magnetic Peripherals Inc., Minneapolis, Minn.

[21] Appl. No.: 830,146

[22] Filed: Feb. 18, 1986

[51] Int. Cl.$^4$ .................... G11B 5/54; G11B 21/08
[52] U.S. Cl. ................................. 360/106; 360/75; 360/97
[58] Field of Search ................. 360/106, 107, 109, 84, 360/95, 97–99, 75, 77–78

[56] References Cited

U.S. PATENT DOCUMENTS 4,327,384 4/1982 Tomita et al. ................ 360/107 X
4,363,046 12/1982 Saito ............................. 360/106

Primary Examiner—John H. Wolff
Attorney, Agent, or Firm—Joseph A. Genovese; Michael B. Atlass

[57] ABSTRACT

This invention describes a means and method for moving an arm in precise angular increments to a degree of precision far beyond the capacity of a normal reduction gear assembly acting at the impetus of a stepper motor. At rest a set of paired and unequal high precision gear sets hold the member in place. To accomplish movement, they are decoupled and a normal reduction gear mechanism is employed to drive the member to the approximate location desired. The more precise location of the member is accomplished by the recoupling the high precision gear sets. Thus, without high precision movement a high precision location is attained.

7 Claims, 6 Drawing Figures

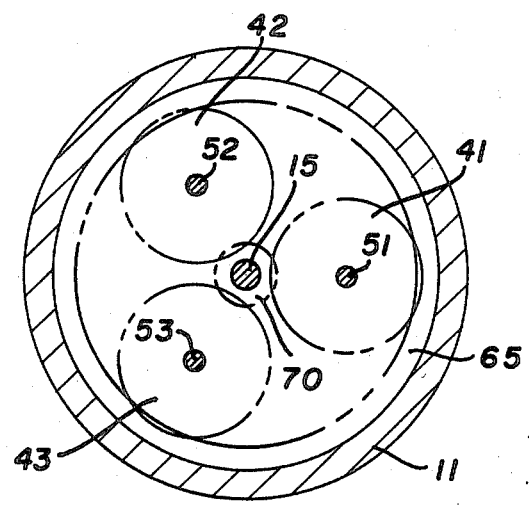
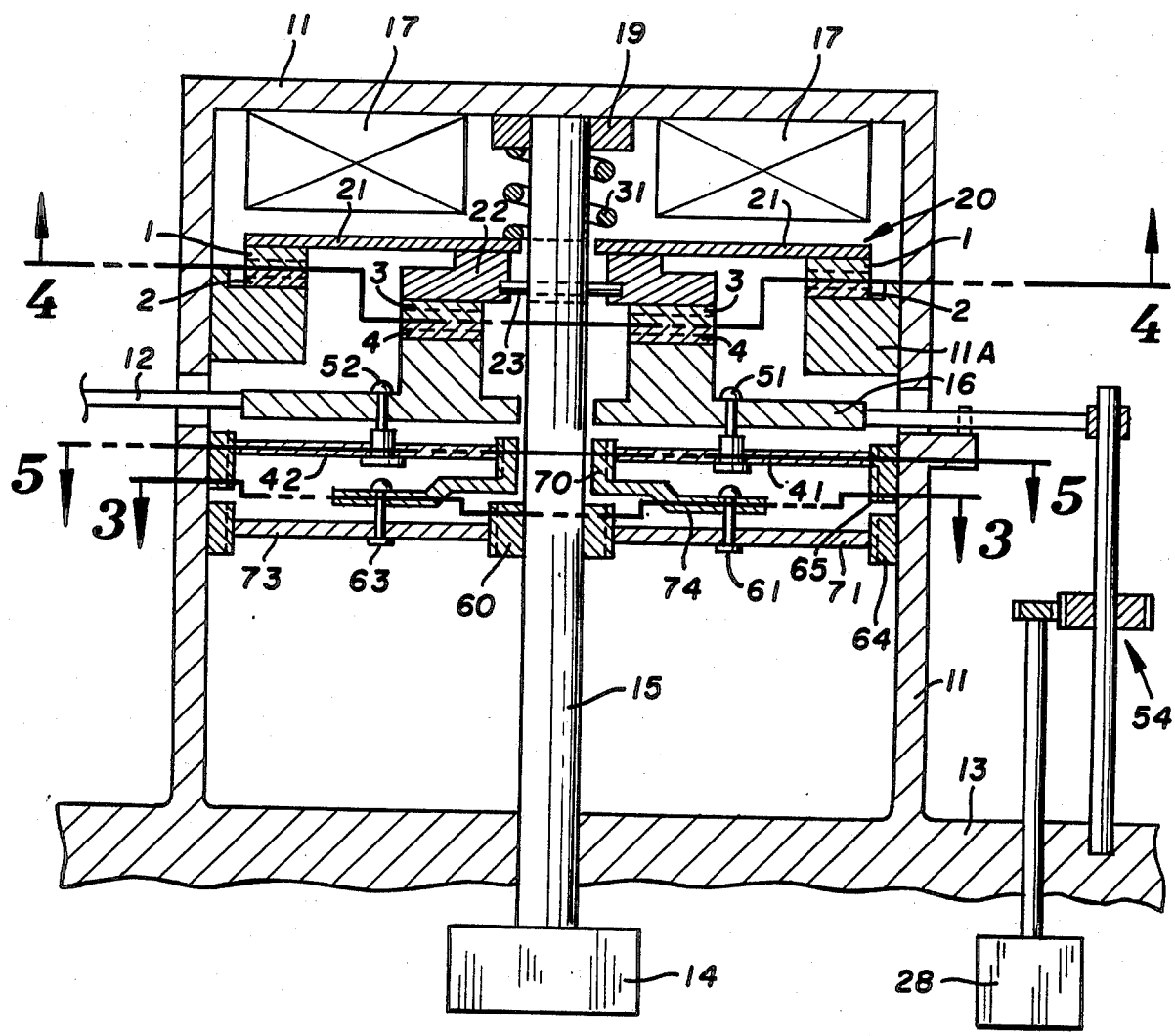
FIG. 5
FIG. 6 ature for the first mechanism used in the second

MEANS FOR INDEXING A ROTARY ARM IN SMALL ANGULAR STEPS

This invention relates to mechanical positioning devices and has particular application to disk based information storage and retrieval devices.

BACKGROUND OF THE INVENTION

In the disk drive, particularly those employing "floppy" disk media, positioning of the read/write elements is often accomplished by actuation in preset steps rather than through feedback driven servo control mechanisms. High information track density in such systems can only be realized through consistently repeatable and accurate stepping such as the mechanically indexed positioning device provided by this invention. The invention may also find applicability in various apparatus which require accurate, small incremental movements.

The invention herein produces accurate angular steps, which are convertible to accurate linear steps by use of a band drive arrangement. Such band drive arrangements are commonly used to convert angular movement to linear movement. See, for an example of this, U.S. Pat. No. 3,881,189, incorporated herein by reference.

SUMMARY OF THE INVENTION

Accordingly, this invention may provide a means for accurately indexing rotary arms in small angular steps which can be the basis for a device which produces repeatable and accurate stepping in a basically radial direction (vis-a-vis the disk media). It may have particular application to accurately positioning read/write elements over tracks on disk based information storage media that have high track densities.

Basically, the invention uses two sets of paired gear members or clutch pair, one set having slightly more teeth than the other, one member of the four being immovable and the moveable member of that set being directly linked to one member of the other set.

Two embodiments are described herein which employ the inventive concepts described. In the first, a single stepping motor is used to drive two mechanisms. The first of these two mechanisms in the first embodiment is simply a gear reduction having relatively inexpensive nonprecision gears. This mechanism will index an arm to approximately the required angle in steps of approximately the size required. The second mechanism used in both the first and second embodiments comprises two high-precision toothed face clutches (as described in the above paragraph) which, when engaged, accurately position the rotary arm.

Accurate rotary or radial positioning may easily be translated by direct mechanical linkage means (e.g. by a band drive as in U.S. Pat. No. 3,081,169) as is well known.

In the second embodiment the second mechanism is also employed but a different "first" mechanism is used. This different "first" mechanism is driven by a second stepper motor which steps at larger increments thus turning the indexed arm further per step than the motor of the first embodiment. Note that it is believed that the means or structure by which the first mechanism accomplishes the larger stepping is not of critical importance to the invention.

During a "seek", using this second embodiment, which allows for quick positioning a head (and arm) a large number of tracks away from the current location, the first stepping motor and the two toothed face clutches all disengage, so that a second stepping motor may move the actuator arm to approximately the desired position. Here, in the second embodiment, accurate final position is achieved (as in the first embodiment) by the re-engagement of the two precision toothed face clutches. Use of this second embodiment substantially reduces the number of total stepper motor steps required to position the actuator arm. Time to position the actuator is therefore reduced.

The nature of this invention as well as other objects, features and advantages will become more apparent when the detailed description is read as a merely illustrative description of the concepts of this invention; and when taken together with the accompanying drawings, the invention is only limited as set forth in the claims.

BRIEF DESCRIPTION OF THE DRAWINGS

FIG. 5 is a cross-sectional top view taken at line 5—5 of FIG. 2.

FIG. 6 is a cross-sectional view of the second preferred embodiment.

DETAILED DESCRIPTION OF THE PREFERRED EMBODIMENTS

Figure 1:
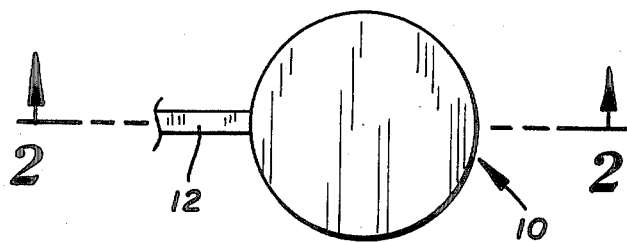
FIG. 1 is a top view of the preferred embodiment.

In FIG. 1, arm member 12 is seen to protrude from housing 11 of indexing assembly 10 in the preferred embodiment.

Figure 2:
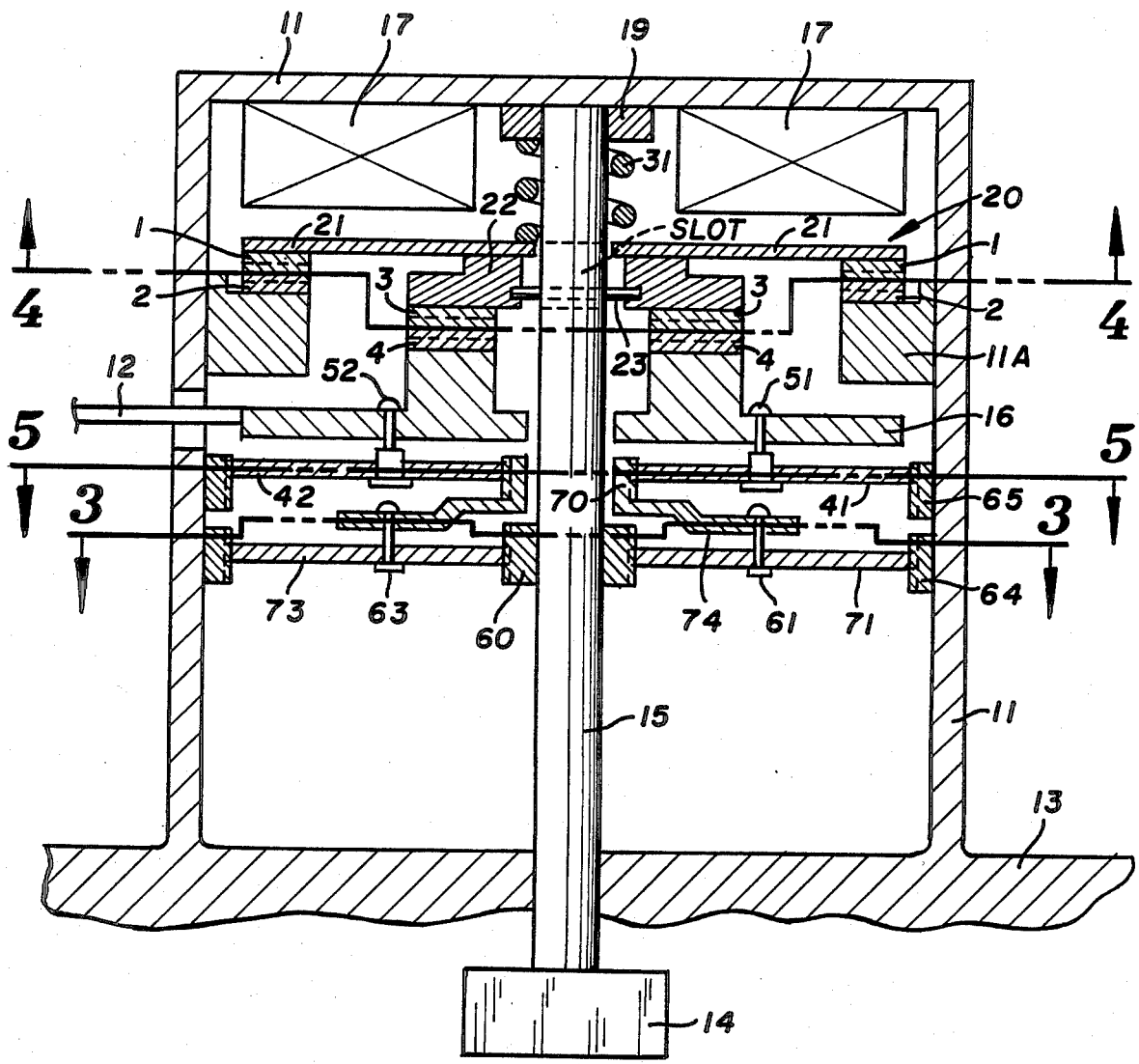
FIG. 2 is a cross-sectional side view of the preferred embodiment, taken at line 2—2 of FIG. 1.

Referring to FIG. 2, the entire housing 11 is seen to be integrally connected to a base structure 13. Any housing structure will suffice so long as it supports shaft 15, electomagnetic solenoid 17 and keeps support 11A immovable relative to shaft 15. (For the second preferred embodiment it must also be able to admit another gear mechanism.)

Coarse position of arm member 12 is generally accomplished in the first embodiment by rotation of a stepper motor 14 turning shaft 15 whose motion is reduced by a system of reduction gears 50 and transferred from those reduction gears through connection pin 51 (and pins 52 and 53 of FIG. 5) to disk 16 to which arm member 12 is solidly attached.

Coarse positioning cannot occur unless solenoid 17 has first pulled "up" on diaphram 21. This lifts attached face clutch member 1, diaphragm 21, ring 19, and face clutch member 3 at the same time, as a unitary assembly 20. Thus, when solenoid 17 is activated, the engagement between toothed face clutch member 1 and toothed stationary face clutch member 2 is released, as is that engagement between toothed face clutch member 3 and toothed face clutch member 4.

When coarse positioning is achieved, solenoid 17 releases diaphram 21 and allows assembly 20 to be forced downward by spring 31, causing the re-engagement of the two pair of face clutch members and thereby accurately positioning arm member 12 through its connection with disk member 16. The four face clutch members 1, 2, 3, and 4 are precision made with referenced to their concentricity and uniformity of tooth spacing.

Cap 19 is formed to allow for any rotation of shaft 15 and to hold spring 31 in position.

The use of concentric face clutch members is merely the most convenient arrangement and should not be construed to limit the scope of this invention. (For instance, a small number of teeth, detents, protrusions or engaging members could substitute for member 2, or for member 1 (or for 3 or 4) but not for both of either pair of mating units. In any case it is clear that numerous like combinations can have substantially the same effect as that achieved using entire rings of teeth, but use of entire rings of teeth for each member is preferred.

Likewise, the arrangement of the reduction gears herein, or the particular form of the reduction gears shown is not believed to be a limitation; and any other convenient arrangement producing similar reduction is believed to be within the scope of this invention. Any system of reduction gears yielding a one tenth degree least significant figure accuracy should function adequately for the range of movement required.

The invention herein requires that there be slightly more (or slightly less if the embodiment is built differently) teeth on paired face clutch members 3 and 4 than the number of teeth on paired face clutch members 1 and 2. It is also required that face gears 3 and 1 move (when engaged) in solid angular connection with each other, and that both disengage from stationary gear 2 and face clutch member 4 at nearly the same time. It is desirable that when solenoid 17 or its equivalent is de-energized (releasing diaphram 21), clutch members 1 and 2 are fully engaged slightly before clutch members 3 and 4 engage fully. It is required that members 1, 2, 3 and 4 be machined or made with high precision with reference to concentricity and uniformity of tooth spacing. Where other embodiments are chosen which depart from use of these face clutch members, analogous restrictions should be adhered to.

The steps by which consistently repeatable accurate discrete angular rotation is accomplished in accord herewith employing either of the preferred embodiments may be described by example as follows. Assuming for purposes of illustration a step angle of stepping motor 14 of 1.8 degrees per step; members 1 and 2 should have 200 teeth each, making 200 possible engagement positions 1.800 degrees apart (the two extra significant figures reflecting the accuracy of the teeth's spatial relations). The invention would then require that members 3 and 4 have more (or less) than 200 teeth, for this example, 202 teeth. (More than 202 teeth will yield a larger movement of the disk 16 with this illustration.)

In step 1, employing the first embodiment and assuming a single rotational increment is desired, solenoid 17 disengages assembly 20 from members 2 and 4. In the next step, stepper motor 14 rotates assembly 20 clockwise by its engagement to shaft 15 through pin 23 one step, or 1.8 degrees. At the same time, rotation of shaft 15 in the first embodiment also forces the movement of gear reduction assembly 50 to move disk 24 (by connection pin 51) and attached member 22 clockwise approximately 0.018 degrees.

Note that the angular spacing between teeth of members 3 and 4, having 202 teeth, is 1.782 degrees (360 degrees divided by 202 teeth). Thus, when assembly 1 is forced downward (step 3), clutch member 4 is forced to move clockwise 0.018 degrees, to be aligned with member 3 (1.800 minus 1.782). Gear reduction assembly 50 is nonprecision (that is, made with sufficient backlash—also referred to as clearance—to allow for any discrepency between its approximately generated 0.018° and the precision 0.018° movement which member 4 is forced to make on reengagement). Assembly 20 is forced downwardly by spring 31 when solenoid 17 releases diaphram 21, thus holding member 3 (and thus by its engagement to member 4, arm 12) in a firm angular position, 0.018° further in a clockwise direction. (Motion in the opposite direction could be achieved using 198 teeth for gear members 3 and 4.)

An angular step of 0.018 degrees will allow for a 960 tracks per inch configuration on a 5¼" disk with an arm like arm member 12 being about 3½" long from pivot to a head liek transducing head 24.

Note that in the arrangement described, it is desirable that members 1 and 2 engage first, followed by gear members 3 and 4 to assure that the rotating member 1 positions accurately relative to stationary face gear member 2 prior to face gear member 4 positioning itself accurately relative to face gear member 3. This will minimize the residual position error due to unavoidable friction and elasticity of the parts.

Figure 3:
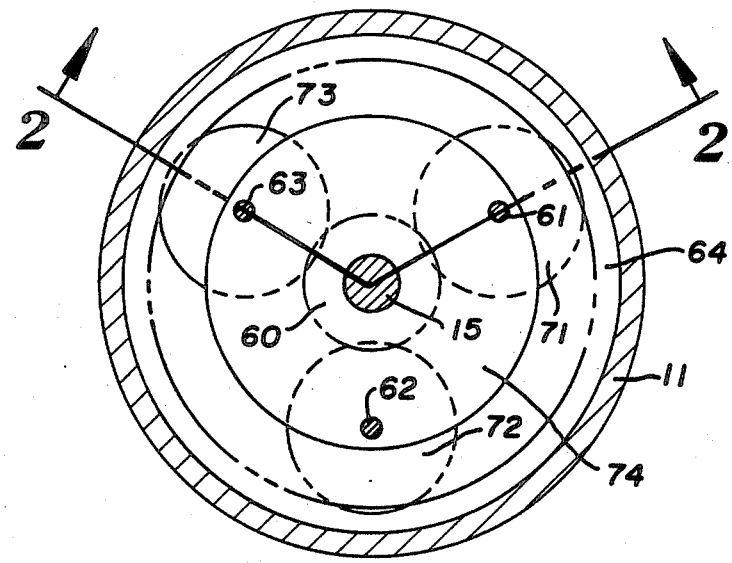
FIG. 3 is a cross-sectional top view taken through line 3—3 of FIG. 2.
Figure 4:
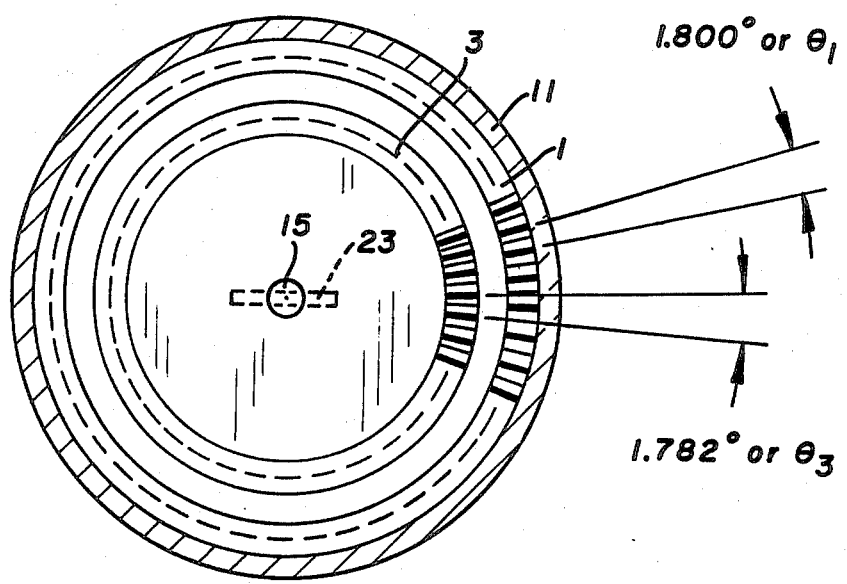
FIG. 4 is a cross-sectional top view taken at line 4—4 of FIG. 2.

Gear reduction assembly 50 may be any one of a number of systems including the example illustrated in FIGS. 2, 3, and 5. Illustrated is a two-stage planetary gear reduction system having a 101 to 1 ratio with the input shaft 15 being driven by stepping motor 14. The output element is disk 16. Disk 16 is attached by pins 51 (FIG. 2), 52 and 55 (FIG. 5). Two sun gears or pinions 60 and 70 each have 10 teeth, and ring gears 64 and 65 have 90 and 91 teeth respectively. Another form could employ a four-gear spur gear system having, for example, 2 toothed drive gears of 10 teeth each, a 100 tooth driven gear, and 101 tooth driven gear. It is merely required that this gear reduction system 50 bring face gear member 4 to within the engagement range of face gear member 3 and that there be enough looseness in the prepositioning gear reduction system 50 not to restrict the face gear members from moving the disk 16 and output member 12 to the correct final position.

To move two steps, the stepper motor 14 and shaft 15 would be stepped through two steps, or 3.6 degrees. Upon re-engagement of assembly 21 with clutch members 2 and 4, the output member 12 would have rotated 0.036 degrees. In the event the number of steps desired is large, however, as for example 800 steps, the first embodiment will work as previously described with the sole exception being the number of steps the stepping motor is commanded to make while the toothed clutches are disengaged. The operation of the second embodiment is different for large number of steps as will now be explained.

With the second embodiment, to move any given number of steps, the first stepping motor 14, which drives shaft 15 and assembly 1, would be commanded to make a number of steps N, such that:

$N = S - I(X)$, where $S$ = the number of steps desired, $I$ is that integer which results in the smallest absolute value for N and X is 200 for the number of teeth in the toothed face clutch pair (members 1 and 2).

Thus for $S = 800$ steps, and $I = 4$; $N = 0$; meaning stepper motor 14 would not be stepped at all. Note that if 799 steps clockwise were required, stepping motor 14 could rotate assembly 20 to the required position by making one step counterclockwise (i.e., $S = 799$, $I = 4$, and $N = -1$). The second embodiment employs a second stepping motor 28 to effect larger movements of member 16. Motor 28 is stepped that number of steps required to bring the output member disk 16 within less than a half tooth (of both face clutch member pair) of the desired final accurate position. A preferred arrangement for the second stepping motor 28 is to connect it to output member disk 16 with a reduction gear train 54 designed to rotate disk 16 approximately 0.57 degrees per step of the second stepping motor 28. This allows coarse (approximate) prepositioning of disk 16 within less than ±0.3 degrees which is substantially less than ±0.89 degrees (about ½ of 1.80 degrees or ±½ tooth). This allows ample amounts of room for hysteresis in prepositioning, tooth shape, and other allowances that may be needed. The suggested 0.57 degree steps are approximately equal to 32 gear reduced steps of stepping motor 14, which makes for simple logic to determine when to step second stepping motor 28. That is, for every 32 steps which would be required of stepping motor 14 only one step of motor 28 is required. So an 800 step (or track) leap requires twenty-five steps of stepper motor 28 and none of motor 14. Likewise a 799 track leap would require a backward step of motor 14 and 25 forward steps of motor 28.

It will be apparent to the reader that any gear train/stepper motor combination that would yield a 0.57° degree step approximation as described could be used for this example. Likewise, it would be obvious to the reader that any numbers of teeth or gear ratios could be employed in accord with the teachings of this patent, so long as a slightly different number of "teeth" are used for one face clutch member pair than for the other.

What is claimed is:

1. A device for urging an output arm member in small incremental rotary steps comprising:
   housing means,
   a stepper motor means having a driven shaft,
   first engagement member having first engagement means comprising engagement units which are constructed for detachable engagement with engagement units from other engagement means, said engagement units being of one angular size,
   second engagement member having second engagement means comprising second engagement units for detachable engagement with said first engagement units, said second engagement member being firmly and solidly connected to said housing means,
   third engagement member having third engagement means and being in solid connection with said first engagement member such that movement of said first and third engagement members occurs in unison as an assembly, and where rotary movement of said assembly is directly linked to movement of said driven shaft, said third engagement means comprising third engagement units having a slightly smaller or larger angular size than the angular size of said first engagement units,
   fourth engagement member in solid connection with said arm member and having fourth engagement means comprising fourth engagement units for detachable engagement to said third engagement units, said fourth engagement member being engaged through a gear reduction assembly so arranged and disposed to translate incremental rotations of said driven shaft to increments approximating the measure of the difference between the angular sizes of said first and second engagement units to said driven shaft,
   wherein disengagement of said first and third engagement members from said second and fourth engagement members, respectively, allows said first and third engagement members to move in a rotary direction responsive to said stepper motor shaft and wherein reengagement of said first and second engagement members to said third and fourth engagement members, respectively, must produce realignment of said third and fourth engagement units to an accuracy on the same order of magnitude as is the difference between the angular sizes of said first and said second engagement units.

2. A device as set forth in claim 1 wherein said engagement units are in the form of at least one protrusions on one of said engagement means for each pair of engagement members, and wherein the other member of each pair comprises a multiple of equally spaced matable detents.

3. In an information storage device employing disk shaped record carriers whereon information is arranged in substantially concentric tracks and wherein a read/write head means is moved radially across said tracks to read or modify information on radially different tracks, the device set forth in claim 1 employed to impart radial motion to said read/write means further compromising direct mechanical linkage means between said read/write means and said arm member.

4. The device set forth in claim 3 wherein said mechanical linkage means is a means for translating radial motion to linear motion between said read/write means and said arm member and imparts linear motion to said read/write means.

5. A device as set forth in claim 1 wherein said device further comprises a second stepper motor means and second gear reduction means engaging with said fourth engagement member to provide larger nonprecision incremental stepping movement to said fourth engagement member than said first stepper motor means to provide for faster rotary movement of said arm member where a large member of said small incremental steps is required.

6. In an information storage device employing disk shaped record carriers whereon information is arranged in substantially concentric tracks and wherein a read/write means is moved radially across said tracks to read or modify information on radially different tracks, the device set forth in claim 4 employed to impart radial motion to said read/write means by solid connection thereto.

7. The device set forth in claim 6 wherein said solid connection comprises a mechanical linkage means for translating radial motion to linear motion between said read/write means and said arm member.

* * * * *